Nov. 1, 1966
G. C. McGOUIRK
3,281,868
DENTAL APPARATUS
Filed April 23, 1963
2 Sheets-Sheet 1
Fig. 1
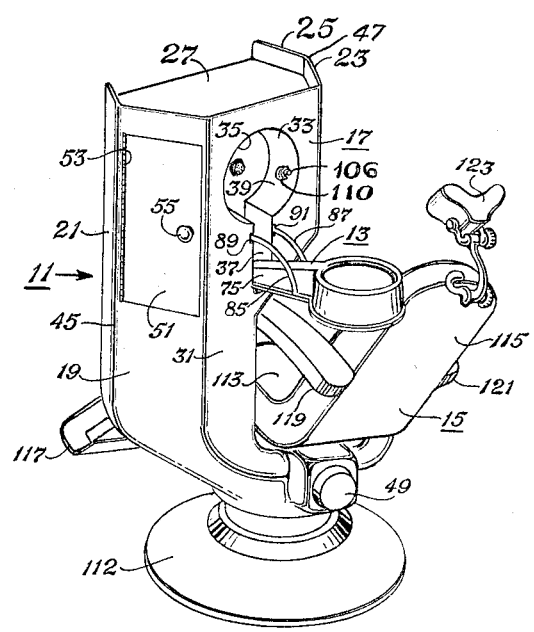
Fig. 2
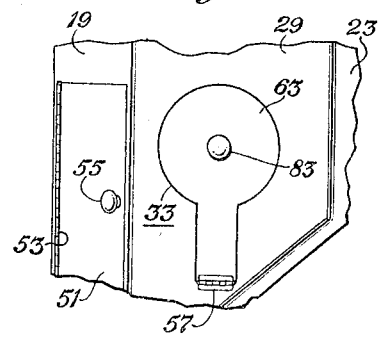
Fig. 3
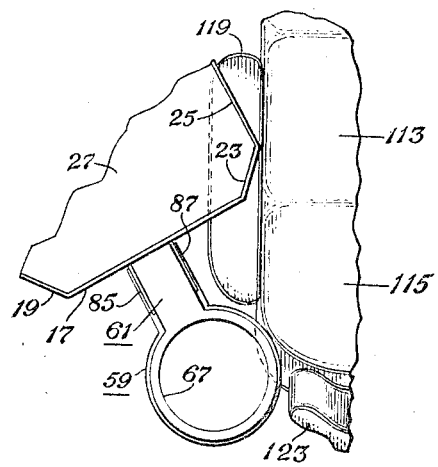
Fig. 4
Fig. 5
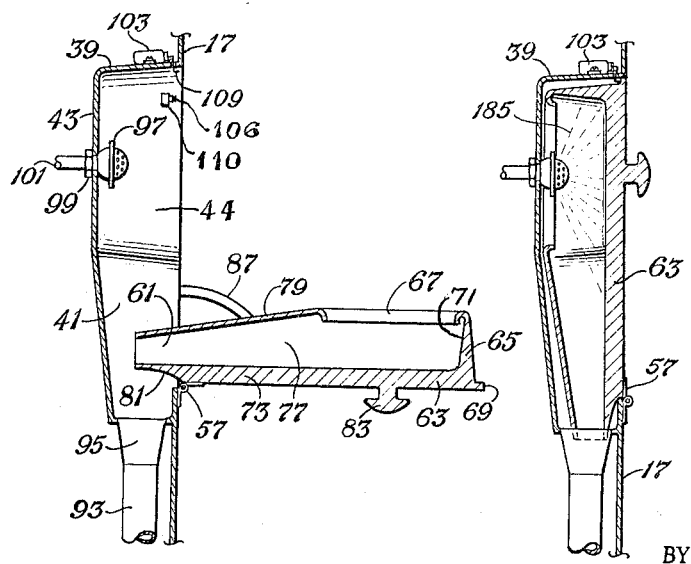
Fig. 10
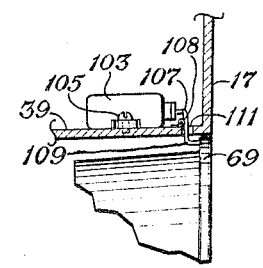
INVENTOR.
Glenn C. McGouirk
BY
Wm. T. Wofford
Attorney Nov. 1, 1966  G. C. McGOUIRK  3,281,868
DENTAL APPARATUS Filed April 23, 1963

INVENTOR.
Glenn C. McGouirk
BY
Wm. T. Wofford
Attorney

United States Patent Office 3,281,868
Patented Nov. 1, 1966

3,281,868
DENTAL APPARATUS
Glenn C. McGouirk, 3200 Chaparral Lane,
Fort Worth, Tex.
Filed Apr. 23, 1963, Ser. No. 275,113
9 Claims. (Cl. 4—263)

My invention relates to dental apparatus and more particularly to improved dental cuspidor apparatus and arrangements.

During the course of the ordinary dental work, a dental patient frequently needs to expectorate the mixture of bone cuttings, saliva, antiseptic spray and the like which accumulate periodically in his mouth. It is customary for the dentist to provide some type of cuspidor into which the patient may expectorate so that he may thereafter be more relaxed and comfortable, and the dentist, of course, may be able to perform his work much more efficiently and effectively. Dental cuspidors are commonly made in three general types: One type of dental cuspidor is a small receptacle which is attached to one end of a flexible vacuum tube and which may be held in the patient's hand; another type of dental cuspidor is a free-standing device mounted on a pedestal which is generally fixed to the floor of the dentist's operation room; and another type of dental cuspidor is a device that is mounted on the usual dental unit which is fixed to the floor of the dentist's operating room.

It is recognized that the hand-held type of dental cuspidor is undesirable because it is too small for convenient practical use, that the hose connected to it interferes with the patient, that it gurgles and makes raucous objectionable sounds, that it is difficult to clean and sterilize, and that it is difficult to use along with a receptacle for water to rinse the mouth. It is recognized that both the free-standing cuspidor and the cuspidor which is mounted on the dental unit have some deficiencies also. Both of these types of cuspidors are mounted close to the dental chair and maintained at a fixed height above the floor of the dentist's operating room. This is rarely a convenient height for the patient, since the dentist must necessarily raise the dental chair, with the patient in it, to a convenient working elevation for him. Hence, for a patient to use such fixed-height cuspidors, it is necessary for the patient to raise partially from a relaxed comfortable position, turn to the left and lower his head to approach the cuspidor. Thereafter, he returns to the supine position, and more of the dentist's time is consumed while the patient gets settled again in a relaxed comfortable position. As is well known, during a dental program, it may be and usually is necessary to expectorate numerous times. Each effort to expectorate is time consuming and inconvenient to both the dentist and the patient. The usual fixed pedestal supported cuspidor is a bother and hindrance to the dental assistant who prepares the patient as well as the dental equipment. Some types of pedestal or unit supported cuspidors, which pivot in a horizontal plane, are damaged occasionally because they are pivotally located above the arm of the chair when it is moving upward. It is recognized, too, that both the fixed-height types of dental cuspidors are fitted with a tube from which a stream of water emerges constantly to flush the cuspidor. This, too, can be noisome, and frequently is annoying to both the patient and the dentist.

It is generally recognized that the types of dental cuspidor apparatus and arrangements, which are available in the prior art of which I am aware, have not proved to be entirely satisfactory.

Accordingly it is the general object of the present invention to provide improved dental cuspidor apparatus and arrangements.

Another object of the invention is to provide a dental cuspidor apparatus and arrangements that is more convenient for the patient to use.

Another object of the invention is to provide a dental cuspidor apparatus and arrangements which is easily and readily manipulatable by the patient to a useable position.

Another object of the invention is to provide a dental cuspidor apparatus and arrangements that is so located and placed that it is not a hindrance to the dental assistant.

Another object of the invention is to provide a dental cuspidor apparatus and arrangements that economizes the dentist's time more effectively.

Another object of the invention is to provide a dental cuspidor apparatus and arrangements that does not make objectionable sounds when in use.

Another object of the invention is to provide a dental cuspidor apparatus and arrangements that is easy to clean and sterilize after each use.

Another object of the invention is to provide a dental cuspidor apparatus and arrangements that uses less water or rinse fluid.

Another object of the invention is to provide a dental cuspidor apparatus that is not subject to damage from the movable dental chair when the cuspidor apparatus is being used.

These and other objects are effected by my invention as will be apparent from the following description taken in accordance with the accompanying drawings, forming a part of this application, in which:

FIG. 1 is a schematic perspective view of a dental unit and dental cuspidor in accordance with a preferred embodiment of my invention;

FIG. 2 is a schematic elevational view of a fragmentary portion of the front side of the dental unit;

FIG. 3 is a schematic plan view of a fragmentary portion of the dental unit showing the cuspidor in the extended useable position;

FIG. 4 is a schematic elevational view along the vertical center plane of the dental cuspidor in the extended position and a portion of the dental unit;

FIG. 5 is a schematic elevational view along the vertical center plane of the dental cuspidor in the retracted position and a portion of the dental unit;

FIG. 6 is a schematic front elevational view of a fragmentary portion of a modified dental unit showing a modified dental cuspidor in its retracted position.

FIG. 10 is a schematic elevational view of the control mechanism for the dental cuspidor rinser.

Figure 7:
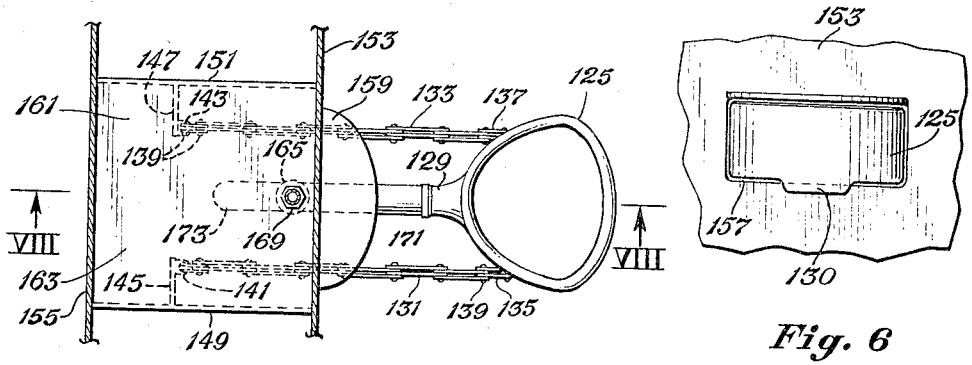
FIG. 7 is a schematic sectional plan view of a fragmentary portion of a modified dental unit showing the modified dental cuspidor in its retracted position.

Referring now to the drawings, there is shown in FIG. 1 a dental unit 11, a dental cuspidor 13, and a dental chair 15.

The dental unit 11 is a generally hollow cabinet that includes a plurality of generally planar panel members which are fixed and maintained in a predetermined angular spaced-apart relation, as shown in FIG. 1. In the dental unit 11 there is: a front panel member 17; first and second left side panel members 19, 21; first and second right side panel members 23, 25; a back panel member which is not shown; and a top member 27. The top member 27 is fixed to the front and side panel members at a location that is slightly below the upper edges of the panel members, as indicated in FIG. 1. The front panel member 17 may be considered as a trapezoidal-shaped upper portion 29 which merges with a rectangular lower portion 31. In the trapezoidal-shaped upper portion 29 there is a key-hole shaped aperture 33, as shown in FIG. 1, having a circular upper portion 35 and a vertical rectangular lower portion 37. An arcuate plate member 39 is fixed generally perpendicularly to the peripheral edge of the circular upper portion 35 and extends within the dental unit, and a trapezoidal-shaped planar plate member 41 is fixed generally perpendicularly to each of the vertical peripheral edges of the rectangular lower portion 37. The upper edges of the trapezoidal-shaped plate members 41 intersect and are suitably sealed and secured to the lower edges of the arcuate plate member 39. A key-hole shaped cover plate member 43 extends across the inner edges of the plate members 39, 41, and is sealed and secured thereto in any suitable manner. Thus, there is formed within the dental unit 11 a receptacle 44 which has a purpose to be described hereinafter. As shown in FIG. 4, the trapezoidal-shaped plate members 41 and the lower portion of the key-hole shaped cover plate member 43 extend slightly below the lower edge of the key-hole shaped aperture 33. The adjoining left side panel members 19, 21 are secured together along a common vertical edge 45 and are disposed obtusely with respect to each other. In like manner, the adjoining right side panel members 23, 25 are secured together along a common vertical edge 47 and are disposed obtusely with respect to each other. The vertical edges of the right and left side panels 19 and 23 adjoin and are secured to the respective right and left vertical edges of the front panel member 17, in any suitable manner. The back member, while not shown, may be fixed and secured in any appropriate manner to the side panel members 21 and 25, as well as to the top member 27. The lower portion of the side, front and back panel members may be formed in any suitable manner to provide a firm connection to the lower support structure 49 of the dental chair 15, for a purpose to be explained hereinafter. An access door 51 is provided in the first left side panel member 19 and is hinged thereto by a conventional type of hinge 53. The access door 51 is also provided with a conventional type of door-pull 55.

The dental cuspidor 13 is pivotally connected to the front panel member 17 adjacent the lower edge thereof by means of an ordinary type of hinge 57. In one embodiment, the dental cuspidor 13 includes a cuspidor bowl 59 integrally formed with a bowl drain-spout 61. The bowl 59 is generally frusto-conical in shape and has a flat bottom 63 and a sloping side wall 65 which terminates in an inwardly rolled upper edge 67. A narrow lip 69, or flange, encircles practically all of the peripheral edge of the bottom 63 and projects therefrom, as shown in FIG. 4. The lip has a purpose that will be explained hereinafter. The inner surface 71 of the side wall 65 tapers inversely from the outer surface thereof and merges with the inner surface of the planar or flat bottom 63 which, if desired in some applications, may slope toward a central channel leading toward the drain-spout 61. The drain-spout 61 has a generally rectangular cross sectional form. It has a flat bottom 73, which is co-planar with the planar or flat bottom 63 of the bowl 59, trapezoidal shaped sides 75, 77, and a sloping top 79. The dental cuspidor 13, as mentioned previously, is hingedly connected to the front panel member 17. The hinge 57 is fixed to the bottom of the drain-spout 73 near the end thereof, and to the front panel 17 adjacent the lower edge of the key-hole shaped aperture 33. The width of the drain-spout is just slightly less than the width of the lower rectangular portion 37 of the key-hole shaped aperture 33 so that it may freely pivot and move thereinto. The free end portion of the bottom 73 is curved about as shown at 81, in order to provide clearance for the dental cuspidor, so that it may pivot upwards into the receptacle 44 without binding against the lower edge of the aperture 33. The dental cuspidor bowl 59 has a diameter, measured over the lip or flange 69, which is just slightly less than the diameter of the circular upper portion 35 of the key-hole shaped aperture 33. Thus, when the dental cuspidor 13 is pivoted upwards, the bowl 59 and drain-spout 61 are received within the receptacle 44 and, it will be noted, the surfaces of the bottoms 63 and 73 are flush with the surface of the front panel 17. A knob 83, or other suitable instrument, may be fixed to the bottom 63 in a convenient location so that the dental cuspidor 11 may be readily and easily manipulated. A pair of thin flat arcuate guide bars 85, 87 are each fixed at one end to the upper surface of the bottom portion 73 at a location near the juncture of the drain-spout 61 with the cuspidor bowl 59. The guide bars 85, 87 are disposed in spaced parallel planes that are generally co-planar with the longitudinal center plane of the dental cuspidor 11. The bars 85, 87 operate in slots 89, 91 respectively in the front panel member 17, and the free end of each bar may be fitted with a suitable enlarged member (not shown) that prevents the free end from emerging from the slot. In other words, the downward pivotal movement of the dental cuspidor 11 is restricted by the enlarged ends of each bar engaging the inner surface of the front panel member 17. A drain conduit 93, which has a flared end 95, is provided within the dental unit 11, and it is fixed adjacent the lower end of the side plate members 41 and cover plate 43 of the receptacle 44, in a convenient position to receive the discharge from the drain-spout 61, when the dental cuspidor is pivoted upward (see FIG. 5). It is preferred that the flared end 95 be sealed to the side plate members 41 and the cover plate 43 of the receptacle 44, as well as to the front panel 17, to prevent leakage within the dental unit 11. This, of course, may be accomplished in any suitable manner. A spray nozzle 97, which may be of any suitable conventional type, is disposed within the receptacle 44 and is located approximately at the center of the circular portion of the key-hole shaped cover plate 43. The spray nozzle 97 projects through the cover plate 43 and may be conveniently fixed in position by a conventional type of lock nut 99. The spray nozzle 97 may be connected in the usual manner to a source of rinse water by means of a pipe 101, or other suitable fluid conduit. One type of spray nozzle which is satisfactory has a plurality of holes disposed in such an arrangement that the spray pattern covers a hemi-spherical surface. On the top of the arcuate plate 39 there is a conventional type of microswitch 103 which may be suitably attached to the plate 39 by screws 105. A switch-actuating lever 107 is pivotally mounted, as by a hinge 108 or in any appropriate manner, on the arcuate plate 39 so that one end 109 of the lever 107, which is preferably formed at right angles, may project through an enlarged hole 111 in the plate 39, and so that the other end of the lever may engage the switch 103. The switch 103 is so located, and the angularly formed end 109 is so disposed, that when the dental cuspidor 13 is in the upper position, that is to say, when it is retracted into the receptacle 44 and in its normal closed position, the lip or flange 69 will not engage the bent end 109 or move the switch actuating lever 107. But, when the dental cuspidor is moved slightly past the closed position, the lip 69 engages the lever 107 and a suitable resilient bias device, such as a spring 106 which may be retained in a protuberance 110 on the arcuate plate 39. The spring 106 engages the lip 69 to urge the cuspidor from the lever-engaging position to the normally closed position. But, it is to be understood, that as long as the lip 69 engages the lever 107, the microswitch 103 and the spray nozzle 97 will operate responsively to the movement of the lever 107.

It will be recognized that one purpose of the receptacle 44 is to receive the dental cuspidor 13 and to confine the rinse fluid emitted as a spray by the spray nozzle 97 to the cuspidor and to a small space within the dental unit which may be made substantially spray-tight. Another purpose of the receptacle 44 is to prevent the rinse fluid spray from impinging on and damaging other dental equipment which may be within the dental unit, but not within the receptacle 44. In some applications, however, especially where there is no other dental equipment within the dental unit, the receptacle 44 may be eliminated, provided some suitable drainage system is provided to receive and convey away the expectoration and rinse fluid from the interior of the dental unit.

The dental unit 11 is conveniently located along side the dental chair 15 which may be of any conventional type that is motor operated; that is to say, the dental chair may be raised and lowered by suitable power means. As mentioned previously, the dental unit 11 may be fixed firmly to the dental chair support structure 49 so that as the dental chair 15 moves up and down, so does the dental unit 11. The dental chair 15 has the usual elements, which include a base structure 112, a seat 113, a back 115, a footrest 117, left and right arm or elbow rests 119, 121 respectively, and an adjustable head rest 123. The chair, of course, may be tilted to any convenient position. It will be noticed from FIGS. 1 and 3, that when the dental chair is tilted to an operating position and when the dental cuspidor is extended as for use, the dental cuspidor is in a very convenient location for easy and ready use by a patient. In fact, a patient occupying the chair needs only to roll his head slightly to the left to be able to expectorate into the cuspidor. Whereupon, the patient may pivot the cuspidor to its normal, retracted or closed position (see FIG. 2) and then quickly, and practically without effort, resume his supine attitude.

Figure 9:
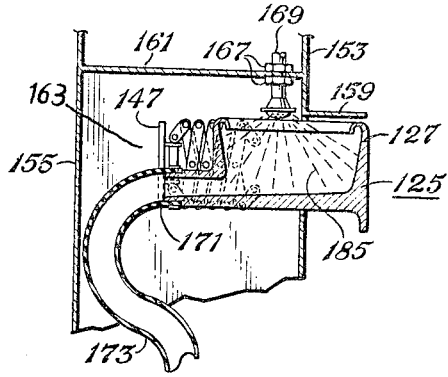
FIG. 9 is a sectional view similar to the view of FIG. 8, but with the modified dental cuspidor in its retracted position.

FIG. 7 illustrates, in plain view, a modified form of dental cuspidor 125 which may be mounted in a dental unit of generally similar form as the unit 11 described herein and shown in FIG. 1. The dental cuspidor 125 basically has the same general type of construction as the dental cuspidor 13 described herein and shown in FIG. 4. The major difference in the structure of the dental cuspidor 125 is its general shape, in plan view; that it has generally straight, vertical sides 127, a shorter drain-spout 129, but it has no outwardly extending peripheral lip or flange comparable with the lip or flange 69 of the cuspidor 13. It is to be noted, however, that a downward extending lip or tab 130 is provided at the front of the dental cuspidor 125 for the purpose of manually pulling the cuspidor into the extended position. Or, if desired, a knob, similar to the knob 83, may be installed on the front vertical surface 127 of the dental cuspidor 125, for a similar purpose. The dental cuspidor 125 has a shape, in plan view, which may be characterized as oval. It is pivotally connected, at opposite locations on its side 127, to one end each of a pair of conventional lazy-tong type structures 131, 133. Preferably, one end of each lazy-tong type structure 131 and 133 is pivotally connected to the respective ends of a first set of short horizontal link members 135 and 137, by pivot pins 139; the other ends of the set of link members 135, 137 being pivotally connected to the side of the cuspidor 127 by pivot pins 139. The other end of each lazy-tong structure 131 and 133 is pivotally connected to the respective ends of a second set of short horizontal link members 135 and 137, also by pivot pins 139; the free ends of the second set of link members 135 and 137 are pivotally connected, also by pivot pins 139, to the upper and lower extremities respectively of short vertical support shafts 141 and 143. Each vertical support shaft 141, 143 is journaled in an angle type of support bracket 145 and 147 for pivotal movement about the axis of the shaft. The support brackets 145 and 147 are, in turn, mounted on spaced parallel side wall members 149, 151 which are fixed to a front panel member 153 and a back panel 155. The front panel member 153 has a rectangular aperture 157 therein into which the dental cuspidor 125 fits when in the retracted position, as shown in FIG. 9. Adjacent the upper edge of the rectangular aperture 157, there is a semi-elliptical cover plate 159 which projects outwardly from the front panel member 153 and which is similar in shape to the right hand arcuate portion of the dental cuspidor 125 (as viewed in FIG. 7). Within the dental unit there is another cover plate 161 which is located slightly above the level of the semi-elliptical cover plate 159. The inside cover plate 161 forms the top covering of a rinse chamber space 163 within the dental unit, into which the dental cuspidor 125 may be retracted for rinsing and cleaning after use. The dental cuspidor 125 is conveniently stowed in the rinse chamber space 163 when not in use. A spray nozzle 165, which may be similar to the spray nozzle 97, is secured in place in the cover plate 161 by means of a pair of lock nuts 167. The spray nozzle 165 is located preferably near the front panel member 153 and is disposed just above the level of the top edge of the dental cuspidor 125. The spray nozzle 163 is connected to a source of rinse water by means of conventional pipe 169, or other suitable fluid conduit, and the spray nozzle 165 may be actuated by a micro-switch 103 and lever 107, in the same manner as shown and described heretofore. One end 171 of a flexible drain hose 173 is connected to the drain spout 129, and the other end, while not shown, may be connected to any convenient sewer drain line.

Another modified form of dental unit and dental cuspidor of my invention, while not shown, may have a pair of spaced parallel side rails, or tracks located within the rinsing chamber, on which a dental cuspidor, of the form shown in FIG. 7, may move. The dental cuspidor would be readily extendable from the dental unit in a horizontal plane to a useable position in the same manner as a drawer of a desk or a file cabinet. Then, after use, the dental cuspidor would be movable back into the rinse chamber of the dental unit for rinsing and cleaning in the manner described hereinbefore.

Yet another modified form of dental cuspidor of my invention, while not so shown, may be fixed to one end of a firm structure which is pivoted, at the other end, to the front panel of the dental unit in such a manner that the dental cuspidor moves arcuately into and out of the dental unit. The dental cuspidor would be pivotable outwardly to a useable position and then, after use, it would be readily pivotable to a retracted position within the rinse chamber for rinsing and cleaning in the manner described hereinbefore.

Those skilled in the art will be able to readily adapt the principles of my invention to other combined forms of dental cuspidors and dental units.

Figure 11:
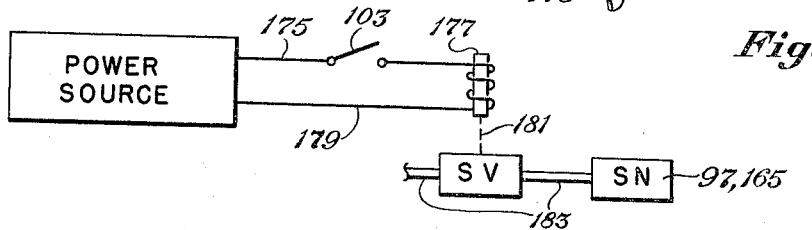
FIG. 11 is a schematic electrical circuit of the dental cuspidor rinser.

Now to understand the use of the dental apparatus of the present invention, reference is made initially to FIG. 1. It may be assumed, for purposes of this description only, that a patient is supinely set in the dental chair 15, and that he has manually pivoted the dental cuspidor 13 to the useable position shown. As mentioned hereinbefore, the dental cuspidor is located convenient to the head rest 123 and may be readily used by the patient. After expectorating into the cuspidor, the patient resumes his relaxed supine position and manually moves the cuspidor upward to the retracted position, as shown in FIG. 2. Actually, the patient moves the dental cuspidor to a position which is just slightly past the normal upright closed position. In this slightly advanced position, the lip or flange 69 engages the bent portion 109 of the lever 107, and causes the lever to pivot about its hinge 108 and actuate the micro-switch 103. Thereafter, as may be noticed in FIG. 11, when the switch 103 closes, electrical current from the "power source" flows via the wire 175 to the solenoid 177 and back to the "power source" via wire 179. The solenoid 177, being mechanically connected, as shown by the dotted line 181, to a fluid flow control valve "SV," opens the control valve "SV" in the rinse water line 183 and rinse water flows to the spray nozzle 97 or 165, indicated generally by the letters "SN" in FIG. 11. When the control valve "SV" opens, in response to pivotal movement of the lever 107, rinse water, which is maintained in the line 183 at a predetermined pressure, as is customary, emerges from the spray nozzle openings as a cleansing spray 185 that impinges upon the bowl inner surface. The patient, of course, may control the duration of the flow of rinse water, for as long as necessary or desired, by simply maintaining the lip or flange 69 in contact with the micro-switch operating lever 107. However, experience teaches that it is only necessary to maintain contact with the lever 107 and operate the spray nozzle for a few seconds. As mentioned previously, a resilient bias device such as a spring 106 may be incorporated in a protuberance 110 fixed to the wall of the receptacle 44, or with the hinge 57, for the purpose of urging the dental cuspidor away from the slightly advanced position in which it engages the switch operating lever 107, to the normal spray nozzle inoperative, retracted position. Thus, when the patient moves the dental cuspidor from its useable or extended position to its closed or retracted position, he moves it slightly beyond and presses the lip or flange 69 against the lever 107 to operate the spray nozzle rinser and against the spring 106. But, just as soon as the patient releases the dental cuspidor, the resilient bias device 106 urges the dental cuspidor away from contact with the lever 107 to its normally closed or retracted position; whereupon, the flow control valve closes, stopping the rinse spray. The normal position of the dental cuspidor, as mentioned previously, is the retracted or closed position. When it is necessary to expectorate, the patient reaches up and grasps the knob 83 and pivots the dental cuspidor downward to its operative position. After expectorating, the patient moves the dental cuspidor to its normal closed position making sure he causes the spray nozzle to operate as previously described, and releases it. The cuspidor will remain in the closed position until it is necessary or desirable to use it again.

Figure 8:
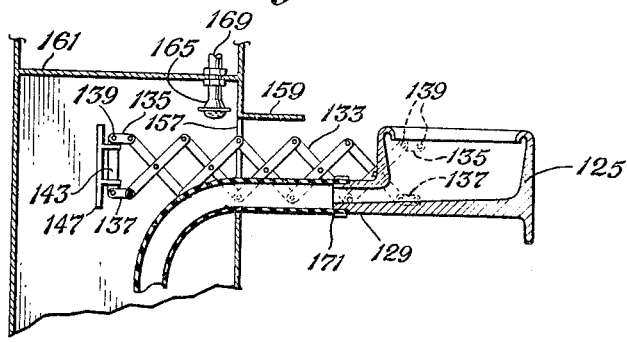
FIG. 8 is a sectional view taken along line VIII—VIII of FIG. 7.

The manner of using the modified dental cuspidor 125 of FIGS. 7, 8 and 9 is similar to the method described previously, except that the cuspidor 125 moves into and out of the dental unit spray and rinse chamber 163 by means of the lazy-tong structures 131, 133. The patient moves the cuspidor into the dental unit spray and rinse chamber and actuates the micro-switch lever 107 in the same manner as described previously. In like manner, the spray nozzle emits a spray of water which impinges on the inner surface of the bowl of the cuspidor 125 to rinse and flush therefrom the expectoration via the drain hose 173. And, finally, after rinsing and cleaning, the dental cuspidor is returned to its normal closed or retracted position by the same or a similar type of resilient bias device, as described previously.

Now, as for the materials of construction, the dental cuspidor may be made of any appropriate material; typical appropriate materials being glass, porcelain covered metal, stainless steel, fiber glass, or any one of several suitable plastics compositions which are readily and easily formable. The dental unit itself may be made of the usual and customary metal or plastics materials, and in other shapes and forms if desired.

A feature of the present invention is that the dental cuspidor is readily and easily movable in a vertical plane from a normally closed, inconspicuous position within the dental unit to any extended, open, useable position and back to a closed position. It is generally recognized that not every dental patient needs to use a dental cuspidor; but, when such is required, the dental cuspidor of my invention is conveniently available and readily useable in the manner described hereinbefore. Thus, when not in use, the dental cuspidor of my invention is normally out of sight and is conspicuous only for as long a time as it must be used.

Another feature of the present invention is that the dental cuspidor in one embodiment not only is extendable and retractable in a vertical plane, but also is pivotable about a vertical axis to more readily be accommodating to the patient's supine position.

Another feature of the present invention is that the dental cuspidor is easily rinsed and cleaned by the water emitted by the spray nozzle under the control of the patient. It should be recognized that the water of the spray may be either cold or hot, or at any suitable temperature between hot and cold. Since the spray nozzle acts only when the dental cuspidor is beyond the normally closed position, the steam or vapor of heated water, should such be used, will be contained within the rinse chamber and will not be objectionable to the patient. If desired, the water temperature may be close to boiling so that a more thorough sanitizing action will result.

Another feature of the present invention is that both the dental unit and the dental cuspidor move with the dental chair. Thus, the dental cuspidor, in the useable position, remains at a constant fixed level relative to the patient. The patient always finds the dental cuspidor at the same relative useable level regardless whether the dentist has elevated the patient and the chair for better working conditions.

Another feature of the present invention is that the dental cuspidor is recessed within the dental unit except when in actual use, and so is not a bother and hindrance to the dental assistant while preparing the dental equipment and the patient.

Another feature of the present invention is that there is a considerable saving in the amount of rinse water that is used compared to the amount of rinse water used by prior art devices. Since the rinse water is normally used only when the cuspidor of my invention is returned to its closed position, and then only for as long a time as the patient determines, there is considerably less rinse water used than in prior art dental cuspidors wherein a stream of rinse water is flowing constantly during a dental operation.

While I have shown my invention in several forms, it will be obvious to those skilled in the art that it is not so limited, but is susceptible of various changes and modifications without departing from the spirit thereof.

I claim:

1. The combination with a movable dental chair of a dental unit fixed to said chair and movable therewith; and a dental cuspidor which is connected to and supported by said dental unit and movable in a vertical plane relative to said dental unit between an extended position and a position where said cuspidor is retracted into said dental unit.

2. The invention set forth in claim 1 wherein said dental cuspidor is pivotally connected to said dental unit and is movable about a horizontal axis fixed relative to said unit; and means are operable when retracted for rinsing and draining said cuspidor.

3. The combination with a movable dental chair of a dental unit fixed to said chair and movable therewith; a dental cuspidor having a bowl and a drain-spout and being extensibly and retractably mounted to said dental unit, the extensile and retractile movement being in a vertical plane; means operable when said bowl is retracted for rinsing said bowl with a rinse fluid; and means within said unit for receiving and draining said rinse fluid.

4. The combination with a movable dental chair of a dental unit fixed to said chair and movable therewith; a dental cuspidor having a bowl and drain-spout, said cuspidor being pivotable in a vertical plane into and out of said unit about an axis fixed relative to said unit; a receptacle within said dental unit to receive said dental cuspidor; a spray nozzle connected to a source of rinse fluid and disposed within said receptacle; a spray nozzle control mechanism fixed relative to said receptacle and actuatable by said dental cuspidor when said cuspidor is pivoted into said receptacle; and means fixed to said unit adjacent said drain-spout to receive and drain said rinse fluid.

5. The combination with a movable dental chair of a dental unit fixed to said chair and movable therewith; a dental cuspidor having a bowl and drain-spout, said cuspidor being pivotable in a vertical plane into and out of said unit about an axis fixed relative to said unit; a spray nozzle connected to a source of rinse fluid and disposed within said dental unit; a spray nozzle control mechanism fixed relative to said dental unit and actuatable by said dental cuspidor when said dental cuspidor is pivoted into said dental unit; and means fixed to said unit adjacent said drain-spout to receive and drain said rinse fluid.

6. The combination with an elevatable dental chair of a dental unit fixed to said chair and movable therewith; a dental cuspidor having a bowl and drain-spout and being mounted on said dental unit for planar extensile and retractile movement from and into said unit, said cuspidor being pivotable about an axis simultaneously with said extensile and retractile planar movement; a receptacle within said dental unit to receive said cuspidor; a spray nozzle connected to a source of rinse fluid and disposed within said receptacle; a spray nozzle control mechanism fixed relative to said receptacle and actuatable by said dental cuspidor; and means for receiving and draining said rinse fluid.

7. The combination with an elevatable dental chair of a dental unit fixed to said chair and movable therewith; a dental cuspidor having a bowl and drain-spout and being mounted on said dental unit for planar extensile and retractile movement from and into said unit, said cuspidor being pivotable about an axis simultaneously with said extensile and retractile planar movement; a receptacle within said dental unit to receive said cuspidor; a spray nozzle connected to a source of rinse fluid and disposed within said receptacle; a spray nozzle control mechanism fixed relative to said receptacle; means for actuating said nozzle control mechanism to cause said spray nozzle to emit rinse fluid when said cuspidor is moved past its normally closed position; and resilient bias means urging said dental cuspidor from said nozzle control mechanism actuating position to said normally closed position wherein said nozzle control mechanism is not actuated.

8. The combination with a movable dental chair of a dental unit fixed to said chair and movable therewith; a dental cuspidor having a bowl and drain-spout, said cuspidor being pivotable in a vertical plane into and out of said unit about an axis fixed relative to said unit; a receptacle within said dental unit to receive said dental cuspidor; a spray nozzle connected to a source of rinse fluid and disposed within said receptacle; a spray nozzle control mechanism fixed relative to said receptacle; means for actuating said nozzle control mechanism to cause said spray nozzle to emit rinse fluid when said cuspidor is moved past its normally closed position; and resilient bias means urging said dental cuspidor from said nozzle control mechanism actuating position to said normally closed position wherein said nozzle control mechanism is not actuated.

9. The combination with a movable dental chair of a dental unit fixed to said chair and movable therewith; and a dental cuspidor which is connected to and supported by said dental unit and movable relative to said dental unit between an extended position and a position where said cuspidor is retracted into said dental unit.

References Cited by the Examiner
UNITED STATES PATENTS

| | | | |
|---|---|---|---|
| 197,977 | 12/1877 | Reynolds | 4—263 |
| 533,445 | 2/1895 | Denison | 32—22 |
| 553,042 | 1/1896 | Ritter | 297—188 |
| 708,345 | 9/1902 | Griswold. | |
| 1,075,287 | 10/1913 | Hayworth et al. | 4—169 |
| 1,564,796 | 12/1925 | Shroyer | 4—168 |
| 1,597,129 | 8/1926 | Watters | 4—168 X |

FOREIGN PATENTS

| | | |
|---|---|---|
| 10,088 | 12/1902 | Austria. |
| 437,666 | 7/1948 | Italy. |

LAVERNE D. GEIGER, *Primary Examiner.*

EDWARD V. BENHAM, *Examiner.*

H. GROSS, *Assistant Examiner.*